US012276937B2

(12) United States Patent
Watanabe

(10) Patent No.: US 12,276,937 B2
(45) Date of Patent: Apr. 15, 2025

(54) MAGENTA TONER AND METHOD FOR PRODUCING THE MAGENTA TONER

(71) Applicant: ZEON CORPORATION, Tokyo (JP)

(72) Inventor: Masashi Watanabe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 213 days.

(21) Appl. No.: 17/276,580

(22) PCT Filed: Sep. 13, 2019

(86) PCT No.: PCT/JP2019/036136
§ 371 (c)(1),
(2) Date: Mar. 16, 2021

(87) PCT Pub. No.: WO2020/066700
PCT Pub. Date: Apr. 2, 2020

(65) Prior Publication Data

US 2022/0050396 A1 Feb. 17, 2022

(30) Foreign Application Priority Data

Sep. 28, 2018 (JP) ................................ 2018-185241

(51) Int. Cl.
*G03G 9/09* (2006.01)
*G03G 9/08* (2006.01)

(52) U.S. Cl.
CPC ........... *G03G 9/091* (2013.01); *G03G 9/0806* (2013.01)

(58) Field of Classification Search
None
See application file for complete search history.

(56) References Cited

U.S. PATENT DOCUMENTS

| | | | | |
|---|---|---|---|---|
| 5,811,213 A * | 9/1998 | Chiba | G03G 9/08795 430/108.1 |
| 2008/0302271 A1* | 12/2008 | Carlini | B82Y 30/00 106/402 |
| 2017/0168408 A1 | 6/2017 | Ohta | |
| 2018/0284631 A1* | 10/2018 | Kayamori | G03G 9/08795 |

FOREIGN PATENT DOCUMENTS

| | | | |
|---|---|---|---|
| CN | 1438547 A | | 8/2003 |
| CN | 106566280 A | | 4/2017 |
| JP | S63-129355 A | | 6/1988 |
| JP | 2002-031918 A | | 1/2002 |
| JP | 2003-122055 A | | 4/2003 |
| JP | 2003207944 A | * | 7/2003 |
| JP | 2007121473 A | * | 5/2007 |
| JP | 2007-155926 A | | 6/2007 |
| JP | 2011150125 A | * | 8/2011 |
| JP | 2013-140238 A | | 7/2013 |
| JP | 2018-173558 A | | 11/2018 |
| WO | 2011/105243 A1 | | 9/2011 |
| WO | 2015/122536 A1 | | 8/2015 |

OTHER PUBLICATIONS

JP-2003207944-A Translation (Year: 2024).*
JP-2007121473-A Translation (Year: 2023).*
JP-2011150125-A Translation (Year: 2024).*
JP-2007121473-A Translation (Year: 2024).*
Notification of Transmittal of Translation of the International Preliminary Report on Patentability (Form PCT/IB/338) issued in counterpart International Application No. PCT/JP2019/036136 mailed Apr. 8, 2021 with Forms PCT/IB/373 and PCT/ISA/237. (9 pages).

* cited by examiner

*Primary Examiner* — Peter L Vajda
*Assistant Examiner* — Charles Collins Sullivan, IV
(74) *Attorney, Agent, or Firm* — WHDA, LLP

(57) ABSTRACT

Provided is a magenta toner which shows sharper color and higher reflection density than ever before, which is excellent in balance between low-temperature fixability and heat-resistant shelf stability, and which has excellent printing durability. Also provided is a method for producing the magenta toner. The magenta toner contains a binder resin and a magenta colorant, wherein a magenta pigment A, which is obtained by surface-treating a pigment represented by the following formula (1) with a metal rosinate, is contained as the magenta colorant; wherein a content of the magenta pigment A is from 1 part by mass to 5 parts by mass with respect to 100 parts by mass of the binder resin; and wherein the metal rosinate is contained at from 1 part by mass to 7 parts by mass with respect to 100 parts by mass of the magenta pigment A:

(1)

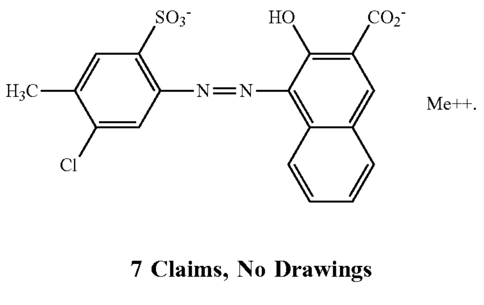

7 Claims, No Drawings

MAGENTA TONER AND METHOD FOR PRODUCING THE MAGENTA TONER

TECHNICAL FIELD

The present disclosure relates to a magenta toner which shows, even in small amounts, sharper color and higher reflection density than ever before, which is excellent in balance between low-temperature fixability and heat-resistant shelf stability, which has excellent printing durability, and which contains less coarse particles. The present disclosure also relates to a method for producing the magenta toner.

BACKGROUND ART

In image forming devices such as an electrophotographic device and an electrostatic recording device, an electrostatic latent image to be formed on a photo conductor is first developed with a toner. Next, the thus-formed toner image is transferred onto a transfer material such as paper if required, and then fixed by various methods such as heating, pressurization and solvent vapor. As such image forming devices, a digital full color copying machine and a digital full color printer have been put to practical use. In the digital full color copying machine, a color image original is subjected to color separation by blue, green and red color filters. Then, electrostatic latent images having a dot diameter of from 20 μm to 70 μm, which corresponds to the color original, are developed with yellow, magenta, cyan and black toners, and a full color image is formed by utilizing a subtractive color mixing action.

In recent years, there is a growing demand for higher image quality and higher definition of the full color image. In particular, for better color reproducibility, it is desired that the full color image is printed with the same hue as ink printing. Conventionally, it is known to use, for example, a quinacridone pigment, a thioindigo pigment, a xanthene pigment, a monoazo pigment, a perylene pigment, a diketopyrrolopyrrole pigment, etc., in a magenta toner.

Patent Literature 1 discloses a toner for developing electrostatic latent images, which is obtained by fusing at least a resin particle and a colorant particle in an aqueous medium and in which a colorant contained in the colorant particle is one selected from Pigment Red 48:1, Pigment Red 48:2, Pigment Red 48:3, Pigment Red 48:4 and Pigment Red 48:5. Patent Literature 1 mentions that such a toner is a toner for developing electrostatic latent images, which causes no change in color tone in thermal fixation.

For example, it is known to improve toner properties by combining an azo lake pigment and a dye.

Patent Literature 2 discloses a magenta toner for color electrophotography, the toner comprising a compound classified as C.I. Disperse Violet 31 and an azo lake pigment. Patent Literature 2 mentions that sharp magenta color can be obtained by using the combination of the azo lake pigment and the dye.

Patent Literature 3 discloses a toner for developing electrostatic images, the toner comprising, as essential components, a binder resin and an azo lake pigment treated with a polyvalent metal salt of rosins, wherein an azo lake pigment treated with a polyvalent metal salt of rosins, the pigment having a contact angle with water ranging from 85° to 110°, is used as the azo lake pigment treated with the polyvalent metal salt of rosins. Patent Literature 3 mentions that since the contact angle of the used azo lake pigment treated with the polyvalent metal salt of rosins, is from 85° to 110°, better pigment dispersibility is obtained, and better transparency and charging stability than the case of using a conventional azo lake pigment, are also obtained.

CITATION LIST

Patent Literature

Patent Literature 1: Japanese Patent Application Laid-Open (JP-A) No. 2002-31918
Patent Literature 2: JP-A No. S63(1988)-129355
Patent Literature 3: JP-A No. 2003-122055

SUMMARY OF INVENTION

Technical Problem

The range of applications of an electrophotographic image forming device has extended from general copying machines and printers which are used for printing office documents and making a copy, to the field of production of printed matters for use outside the office, more specifically, to the print-on-demand (POD) market that is an area of quick printing, since the image forming device can easily print variable information from electronic data. In recent years, therefore, the level of demand required of the reflection density and chroma of a printed product has been rapidly increased.

However, due to the following reasons, it cannot be said that the magenta toners disclosed in Patent Literatures 1 to 3 are applicable to the various applications mentioned above.

First, the results of experiments are disclosed in Patent Literature 1, in each of which C.I. Pigment Red 48:3, 48:1 or 48:4 was used in a suspension polymerization toner (colorant particle manufacturing examples 9 to 11). However, due to a research by the inventor of the present disclosure, it was found that depending on the origin or type of these pigments, coarse particles are formed in large quantities in the case that the colorants are subjected to suspension polymerization as they are.

Next, the dye used in the technique of Patent Literature 2 is characterized in that the dye is, unlike pigments, soluble in solvents and generally has poor resistance to light. Accordingly, a combination of a dye and a pigment may have a problem in that there is a decrease in light resistance in some cases.

Next, in the toner of Patent Literature 3, C.I. Pigment Red 57:1 treated with a polyvalent metal salt of rosins is used. However, due to a research by the inventor of the present disclosure, it was found that coarse particles are formed in large quantities in the case that the pigment is subjected to suspension polymerization.

For chroma and a reflection density of a printed product, the level of demand has been rapidly increased in recent years, in order to be applicable to the wide range of applications. To satisfy such a high level of demand, an object of the present disclosure is to provide a magenta toner which shows sharper color and higher reflection density than ever before, which is excellent in balance between low-temperature fixability and heat-resistant shelf stability, and which has excellent printing durability. Another object of the present disclosure is to provide a method for producing the magenta toner.

Solution to Problem

To attain the object, the inventor of the present disclosure conducted detailed research and found that the magenta toner which shows higher reflection density and chroma than ever before, which is excellent in balance between low-temperature fixability and heat-resistant shelf stability, which has excellent printing durability, and which contains less coarse particles, is obtained by using, as a magenta colorant, a magenta pigment A that is prepared through a specific surface treatment. Based on this finding, the inventor achieved the present disclosure.

That is, the magenta toner of the present disclosure is a magenta toner comprising a binder resin and a magenta colorant, wherein a magenta pigment A, which is obtained by surface-treating a pigment represented by the following formula (1) with a metal rosinate, is contained as the magenta colorant;

wherein a content of the magenta pigment A is from 1 part by mass to 5 parts by mass with respect to 100 parts by mass of the binder resin; and wherein the metal rosinate is contained at from 1 part by mass to 7 parts by mass with respect to 100 parts by mass of the magenta pigment A:

(1)

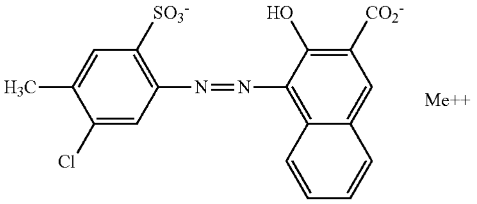

where Me represents a bivalent metal.

In the present disclosure, an acid value of the magenta pigment A may be 2.4 mgKOH/g or less.

In the present disclosure, C.I. Pigment Violet 19 may be further contained as the magenta colorant.

In the present disclosure, C.I. Pigment Red 122 may be further contained as the magenta colorant.

The method of the present disclosure is a method for producing the above-mentioned magenta toner, the method comprising:

a step comprising preparing a polymerizable monomer composition containing a polymerizable monomer and the magenta colorant, a step comprising dispersing the polymerizable monomer composition in an aqueous medium containing a dispersion stabilizer, and a step comprising forming colored resin particles by subjecting the polymerizable monomer composition to polymerization reaction in the presence of a polymerization initiator.

Advantageous Effects of Invention

According to the present disclosure as described above, by using the magenta pigment A subjected to the specific surface treatment, the magenta toner which shows, even in small amounts, sharper color and higher reflection density than ever before, which is excellent in balance between low-temperature fixability and heat-resistant shelf stability, which has excellent printing durability, and which contains less coarse particles, is provided.

DESCRIPTION OF EMBODIMENTS

The magenta toner of the present disclosure is a magenta toner comprising a binder resin and a magenta colorant, wherein a magenta pigment A, which is obtained by surface-treating a pigment represented by the following formula (1) with a metal rosinate, is contained as the magenta colorant;

wherein a content of the magenta pigment A is from 1 part by mass to 5 parts by mass with respect to 100 parts by mass of the binder resin; and wherein the metal rosinate is contained at from 1 part by mass to 7 parts by mass with respect to 100 parts by mass of the magenta pigment A:

(1)

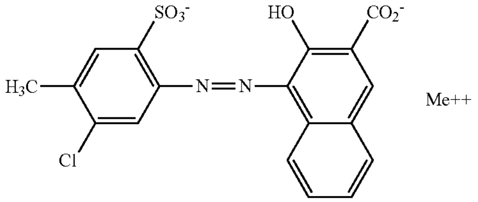

where Me represents a bivalent metal.

Hereinafter, the magenta toner of the present disclosure may be simply referred to as "toner".

Hereinafter, a method for producing colored resin particles preferably used in the present disclosure, the colored resin particles obtained by the production method, and the magenta toner of the present disclosure obtained by using the colored resin particles, will be described in this order.

1. Method for Producing Colored Resin Particles

In general, methods for producing colored resin particles are broadly classified into dry methods such as a pulverization method and wet methods such as an emulsion polymerization agglomeration method, a suspension polymerization method and a solution suspension method. The wet methods are preferable since a toner having excellent printing characteristics such as image reproducibility, can be easily obtained. Among the wet methods, polymerization methods such as the emulsion polymerization agglomeration method and the suspension polymerization method are preferable, since a toner having a relatively small particle size distribution in micron order can be easily obtained. Among the polymerization methods, the suspension polymerization method is more preferable.

The emulsion polymerization agglomeration method is a method for producing colored resin particles by polymerizing emulsified polymerizable monomers to obtain a resin microparticle emulsion, and aggregating the resulting resin microparticles with a colorant dispersion, etc. The solution suspension method is a method for producing colored resin particles by forming a solution into droplets in an aqueous medium, the solution containing toner components such as a binder resin and a colorant dissolved or dispersed in an organic solvent, and removing the organic solvent. Both methods can be carried out by known methods.

The colored resin particles used in the present disclosure can be produced by employing the wet methods or the dry methods. The wet methods are preferable, and the suspension polymerization method is especially preferable among the wet methods. When the suspension polymerization method is employed, the colored resin particles may be produced by the following steps.

(A) Suspension Polymerization Method

(A-1) Preparation Step of Polymerizable Monomer Composition

First, a polymerizable monomer, a magenta colorant and, as needed, other additives such as a charge control agent and a release agent, are mixed to prepare a polymerizable monomer composition. For example, a media type dispersing machine is used for the mixing in the preparation of the polymerizable monomer composition.

In the present disclosure, the polymerizable monomer means a monomer having a polymerizable functional group, and a binder resin is made by polymerization of the polymerizable monomer. It is preferable to use a monovinyl monomer as a main component of the polymerizable monomer. Examples of the monovinyl monomer include styrene; styrene derivatives such as vinyltoluene and α-methylstyrene; acrylic acid and methacrylic acid; acrylic acid esters such as methyl acrylate, ethyl acrylate, propyl acrylate, butyl acrylate, 2-ethylhexyl acrylate and dimethylaminoethyl acrylate; methacrylic acid esters such as methyl methacrylate, ethyl methacrylate, propyl methacrylate, butyl methacrylate, 2-ethylhexyl methacrylate and dimethylaminoethyl methacrylate; nitrile compounds such as acrylonitrile and methacrylonitrile; amide compounds such as acrylamide and methacrylamide; and olefins such as ethylene, propylene and butylene. These monovinyl monomers may be used solely or in combination of two or more kinds. Among them, it is preferable to use styrene, styrene derivative, or derivative of acrylic acid or methacrylic acid as the monovinyl monomer.

To improve hot offset and shelf stability, it is preferable to use any crosslinkable polymerizable monomer in combination with the monovinyl monomer. The crosslinkable polymerizable monomer means a monomer having two or more polymerizable functional groups. Examples of the crosslinkable polymerizable monomer include: aromatic divinyl compounds such as divinyl benzene, divinyl naphthalene and derivatives thereof; ester compounds such as ethylene glycol dimethacrylate and diethylene glycol dimethacrylate, in which two or more carboxylic acids are esterified to an alcohol having two or more hydroxyl groups; other divinyl compounds such as N,N-divinylaniline and divinyl ether; and compounds having three or more vinyl groups. These crosslinkable polymerizable monomers can be used solely or in combination of two or more kinds.

In the present disclosure, the crosslinkable polymerizable monomer is used in an amount of generally from 0.1 to 5 parts by mass, and preferably from 0.3 to 2 parts by mass, with respect to 100 parts by mass of the monovinyl monomer.

The toner of the present disclosure contains a magenta pigment A as the magenta colorant, which is obtained by surface-treating a pigment represented by the formula (1) with a metal rosinate. The magenta pigment A is a pigment represented by the formula (1) and subjected to a surface treatment by a metal rosinate.

The pigment represented by the formula (1) is classified as a so-called lake pigment. The lake pigment is a pigment which is made insolubilized by allowing a metal salt to act on a dye. Since the lake pigment is inexpensive compared with other pigments, the use of the lake pigment has an advantage in that the production cost of a toner can be reduced. However, a conventional lake pigment containing the pigment represented by the formula (1) is still high in its water solubility, even though it is subjected to the insolubilization treatment. Therefore, when the conventional lake pigment is subjected to a polymerization reaction (e.g., a suspension polymerization reaction), there are the following problems: the lake pigment is eluted into an aqueous medium; the formation of droplets containing the lake pigment becomes unstable; and the droplets tend to aggregate with each other. In the present disclosure, by using the magenta pigment A which is obtained by surface-treating the pigment represented by the formula (1) with the metal rosinate, the above-mentioned problem as in a conventional lake pigment does not occur, so that a magenta toner containing less coarse particles can be produced. In addition, the obtained magenta toner shows, even in small amounts, sharper color and higher reflection density than ever before, is excellent in the balance between low-temperature fixability and heat-resistant shelf stability, and has excellent printing durability.

As the pigment represented by the formula (1), examples include, but are not limited to, C.I. Pigment Red 48:1 in which $Me^{++}$ in the formula (1) is $Ba^{++}$, C.I. Pigment Red 48:2 in which $Me^{++}$ in the formula (1) is $Ca^{++}$, C.I. Pigment Red 48:3 in which $Me^{++}$ in the formula (1) is $Sr^{++}$, C.I. Pigment Red 48:4 in which $Me^{++}$ in the formula (1) is $Mn^{++}$, C.I. Pigment Red 48:5 in which $Me^{++}$ in the formula (1) is $Mg^{++}$, and C.I. Pigment Red 48:6 in which $Me^{++}$ in the formula (1) is $Cd^{++}$. Among them, C.I. Pigment Red 48:3 (CAS No. 15782-05-5) in which $Me^{++}$ in the formula (1) is Sr, is preferable. That is, it is preferable that the magenta pigment A is a pigment classified as C.I. Pigment Red 48:3 and is a pigment obtained by surface-treating C.I. Pigment Red 48:3 with a metal rosinate.

As the magenta pigment A, a commercially-available product or a compound synthesized in advance can be used. As the commercially-available product of the magenta pigment A, examples include, but are not limited to, NO. 5500 ST-RED (: product name, manufactured by Daidokasei Co., Ltd.) (pigment classification: C.I. Pigment Red 48:3, the content of the metal rosinate with respect to 100 parts by mass of the magenta pigment A: 5.0 parts by mass) and S-7014 RED (: product name, manufactured by Daidokasei Co., Ltd.) (pigment classification: C.I. Pigment Red 48:3, the content of the metal rosinate with respect to 100 parts by mass of the magenta pigment A: 3.0 parts by mass).

In the case of synthesizing the magenta pigment A, for example, a dye which is used to synthesize the pigment represented by the formula (1) (a lake pigment) is synthesized by a coupling reaction using a coupler component containing a metal rosinate, and the lake of the thus-obtained dye is formed, whereby the magenta pigment A can be obtained. The magenta pigment A can also be produced, for example, by bringing the pigment represented by the formula (1), which is a raw material, into contact with the metal rosinate.

Rosin acid includes any conventional rosin acid known in the art. Examples of the rosin acid include rosin acid based on abietic acid, disproportionate rosin acid, partially-hydrogenated rosin acid, fully-hydrogenated rosin acid, maleic acid-modified rosin acid, fumaric acid-modified rosin acid, and polymerized rosin acid. As the rosin acid, a rosin acid having a low acid value of 170 mg/KOH/g or less is preferable, and a rosin acid having a low acid value of 100 mg/KOH/g or less is more preferable. By using the rosin acid with such a low acid value, the acid value of the magenta pigment A is reduced and, as a result, the production of coarse particles can be suppressed.

The metal rosinate is a salt composed of the rosin acid and a divalent, trivalent or tetravalent polyvalent metal, and it is, for example, a Ca salt, a Ba salt, an Sr salt, an Al salt, a Zn salt, or the like. As the metal rosinate, it is preferable to contain an Sr salt of a rosin acid, from the viewpoint of high improvement effect of flushing properties in, for example, the toner manufacturing steps.

The content of the metal rosinate is generally from 1 part by mass to 7 parts by mass, preferably from 2 parts by mass to 6 parts by mass, and more preferably from 2.5 parts by mass to 5.5 parts by mass, with respect to 100 parts by mass of the magenta pigment A. When the content of the metal rosinate is from 1 part by mass to 7 parts by mass, isolation of the metal rosinate is suppressed, so that the inhibition of the toner production by the isolated metal rosinate or its derivative does not occur, and the toner containing less coarse particles can be obtained. The content of the magenta pigment A is calculated as the total content of the pigment represented by the formula (1), which is a raw material, and the metal rosinate, which is a surface treatment agent.

The acid value of the magenta pigment A is not particularly limited. It is generally 3 mgKOH/g or less. From the viewpoint of inhibiting the formation of coarse particles, it is preferably 2.4 mgKOH/g or less, and more preferably from 0.1 to 2.0 mgKOH/g. From the viewpoint of remarkably inhibiting the formation of coarse particles, it is even more preferably from 0.3 to 1.0 mgKOH/g, and particularly preferably from 0.4 to 0.8 mgKOH/g. The acid value of the magenta pigment A can be controlled by, for example, the type and addition amount of the metal rosinate. For example, by using the metal rosinate having the low acid value as the metal rosinate, the acid value of the magenta pigment A can be controlled to 1.0 mgKOH/g or less.

In the present disclosure, the acid value can be measured in conformity to JIS K 0070.

The content of the magenta pigment A is generally from 1 part by mass to 5 parts by mass, preferably from 1.5 parts by mass to 4.5 parts by mass, and more preferably from 2 parts by mass to 4 parts by mass, with respect to 100 parts by mass of the binder resin. When the content of the magenta pigment A is 1 part by mass or more, the toner which shows, even in small amounts, sharper color and higher reflection density than ever before, which is excellent in between low-temperature fixability and heat-resistant shelf stability, and which has excellent printing durability, can be obtained. When the content of the magenta pigment A is 5 parts by mass or less, the inhibition of the toner production by an excessive amount of the magenta pigment A does not occur. Accordingly, the toner containing less coarse particles can be obtained.

As the magenta colorant that can be used in combination with the magenta pigment A, examples include, but are not limited to, C.I. Pigment Red 31, C.I. Pigment Red 122 (CAS No. 980-26-7), C.I. Pigment Red 146, C.I. Pigment Red 150, C.I. Pigment Red 180, C.I. Pigment Red 185, C.I. Pigment Red 238, and C.I. Pigment Violet 19 (CAS No. 1047-16-1). By using the magenta colorant in combination with the magenta pigment A, better printing durability can be obtained, and the formation of coarse particles can be further inhibited. Among them, C.I. Pigment Red 122 and C.I. Pigment Violet 19 are preferable as the magenta colorant that can be used in combination with the magenta pigment A.

In the case that the magenta pigment A and C.I. Pigment Red 122 are used in combination as the magenta colorant, the magenta toner which shows, even in small amount, sharper color and higher reflection density than ever before, can be achieved at lower cost than ever before.

The content of the C.I. Pigment Red 122 is generally from 1 part by mass to 5 parts by mass, preferably from 1.5 parts by mass to 4.5 parts by mass, and more preferably from 2 parts by mass to 4 parts by mass, with respect to 100 parts by mass of the binder resin. When the content of the C.I. Pigment Red 122 is from 1 part by mass to 5 parts by mass, the magenta pigment A and the C.I. Pigment Red 122 can be contained in good balance, so that much sharper color and much higher reflection density can be obtained.

In the case that the magenta pigment A and C.I. Pigment Violet 19 are used in combination as the magenta colorant, the magenta toner which shows, even in small amount, sharper color and higher reflection density than ever before, can be achieved at lower cost than ever before.

The content of the C.I. Pigment Violet 19 is generally from 1 part by mass to 5 parts by mass, preferably from 1.5 parts by mass to 4.5 parts by mass, and more preferably from 2 parts by mass to 4 parts by mass, with respect to 100 parts by mass of the binder resin. When the content of the C.I. Pigment Violet 19 is from 1 part by mass to 5 parts by mass, the magenta pigment A and the C.I. Pigment Violet 19 can be contained in good balance, so that much sharper color and much higher reflection density can be obtained.

The magenta toner of the present disclosure may contain the magenta pigment A, the C.I. Pigment Red 122, and the C.I. Pigment Violet 19 as the magenta colorant.

As the C.I. Pigment Violet 19 and the C.I. Pigment Red 122, different raw materials may be used, or a colorant composition containing them may be used. As the colorant composition, examples include a mixed crystal of the C.I. Pigment Violet 19 and the C.I. Pigment Red 122.

The C.I. Pigment Violet 19 may be used in the form of a mixed crystal with the C.I. Pigment Red 122, in order to obtain better weather resistance and image density and to further inhibit the formation of coarse particles. That is, the magenta colorant used in the present disclosure may contain the magenta pigment A and the mixed crystal of the C.I. Pigment Red 122 and the C.I. Pigment Violet 19.

The mixed crystal of the C.I. Pigment Violet 19 and the C.I. Pigment Red 122 can be produced by, for example, the method described in U.S. Pat. No. 3,160,510, in which a mixed crystal component is simultaneously recrystallized from sulfuric acid or other suitable solvent, and, if necessary, the recrystallized component is milled with salt and then treated with a solvent, or by the method described in DE 1,217,333 B, in which a substituted diaminoterephthalic acid mixture is cyclized, and the cyclized mixture is treated with a solvent.

The use ratio of the C.I. Pigment Red 122 to the C.I. Pigment Violet 19 is, in mass ratio (C.I. Pigment Red 122: C.I. Pigment Violet 19), generally from 80:20 to 20:80, preferably from 70:30 to 30:70, and more preferably from 60:40 to 40:60.

In the case that two or more kinds of magenta colorants are used, the total content of the magenta colorants is generally from 2 parts by mass to 10 parts by mass, preferably from 3 parts by mass to 9 parts by mass, and more preferably from 4 parts by mass to 8 parts by mass, with respect to 100 parts by mass of the binder resin. When the total content of the magenta colorants if from 2 parts by mass to 10 parts by mass, the obtained toner shows much higher reflection density and chroma, shows better balance between low-temperature fixability and heat-resistant shelf stability, and achieves better printing durability. From the viewpoint of remarkably inhibiting the formation of coarse particles and the viewpoint of improving the low-temperature fixability, the total content of the magenta colorants is preferably 7 parts by mass or less, and more preferably 6 parts by mass or less, with respect to 100 parts by mass of the binder resin.

Further, in the case that two or more kinds of magenta colorants are used, the use ratio of the magenta pigment A to the other magenta pigment different from the magenta pigment A, is not particularly limited. From the viewpoint of obtaining sharper color and higher reflection density, inhibiting the formation of the coarse particles, and improving the printing durability and the low-temperature fixability, the use ratio is, in mass ratio (the magenta pigment A: the other magenta pigment), preferably from 70:30 to 30:70, more preferably from 60:40 to 40:60, and even more preferably from 55:45 to 45:55.

To improve the chargeability of the toner, a positively- or negatively-chargeable charge control agent can be used as another additive.

The charge control agent is not particularly limited, as long as it is one that is generally used as a charge control agent for toner. Among charge control agents, a positively- or negatively-chargeable charge control resin is preferable, since the charge control resin is highly compatible with the polymerizable monomer and can impart stable chargeability (charge stability) to the toner particles. From the viewpoint of obtaining a positively-chargeable toner, the positively-chargeable charge control resin is more preferably used.

As the positively-chargeable charge control agent, examples include a nigrosine dye, a quaternary ammonium salt, a triaminotriphenylmethane compound, an imidazole compound, and a charge control resin such as a polyamine resin, a quaternary ammonium group-containing copolymer and a quaternary ammonium salt group-containing copolymer. Among them, the charge control resin is preferable.

As the negatively-chargeable charge control agent, examples include an azo dye containing a metal such as Cr, Co, Al and Fe, a salicylic acid metal compound, an alkyl salicylic acid metal compound, and a charge control resin such as a sulfonic acid group-containing copolymer, a sulfonic acid salt group-containing copolymer, a carboxylic acid group-containing copolymer and a carboxylic acid salt group-containing copolymer. Among them, the charge control resin is preferable.

In the present disclosure, the charge control agent is used in an amount of generally from 0.01 parts by mass to 10 parts by mass, and preferably from 0.03 parts by mass to 8 parts by mass, with respect to 100 parts by mass of the monovinyl monomer. When the added amount of the charge control agent is less than 0.01 parts by mass, fog may occur. On the other hand, when the added amount of the charge control agent is more than 10 parts by mass, printing soiling may occur.

In addition, it is preferable to use a molecular weight modifier as another additive, when the polymerizable monomer is polymerized to obtain a binder resin.

The molecular weight modifier is not particularly limited, as long as it is one that is generally used as a molecular weight modifier for toners. As the molecular weight modifier, examples include, but are not limited to, mercaptans such as t-dodecyl mercaptan, n-dodecyl mercaptan, n-octyl mercaptan and 2,2,4,6,6-pentamethylheptane-4-thiol, and thiuram disulfides such as tetramethyl thiuram disulfide, tetraethyl thiuram disulfide, tetrabutyl thiuram disulfide, N,N'-dimethyl-N,N'-diphenyl thiuram disulfide and N,N'-dioctadecyl-N,N'-diisopropyl thiuram disulfide. These molecular weight modifiers may be used solely or in combination of two or more kinds.

In the present disclosure, the molecular weight modifier is used in an amount of generally from 0.01 parts by mass to 10 parts by mass, and preferably from 0.1 parts by mass to 5 parts by mass, with respect to 100 parts by mass of the monovinyl monomer.

In addition, it is preferable to add a release agent as another additive. By adding the release agent, the releasability of the toner from a fixing roll during fixing, can be improved. The release agent is not particularly limited, as long as it is one that is generally used as a release agent for toners. As the release agent, examples include, but are not limited to, low-molecular-weight polyolefin waxes and modified waxes thereof; petroleum waxes such as paraffin; mineral waxes such as ozokerite; synthetic waxes such as Fischer-Tropsch wax; and ester waxes such as dipentaerythritol ester and carnauba. Since the toner can achieve a balance between shelf stability and low-temperature fixability, ester waxes are preferable, and synthetic ester waxes that are obtained by esterifying an alcohol with a carboxylic acid, are more preferable. Among the synthetic ester waxes, one that is obtained by using a polyalcohol as the alcohol and a mono-carboxylic acid as the carboxylic acid, is more preferable. They may be used solely or in combination of two or more kinds.

The release agent is used in an amount of preferably from 1 part by mass to 30 parts by mass, and more preferably from 5 parts by mass to 20 parts by mass, with respect to 100 parts by mass of the monovinyl monomer.

(A-2) Suspension Step to Obtain Suspension (Droplets Forming Step)

In the present disclosure, the polymerizable monomer composition containing the polymerizable monomer and the magenta colorant is dispersed in an aqueous medium containing a dispersion stabilizer; a polymerization initiator is added therein; then, the polymerizable monomer composition is formed into droplets. The method for forming the droplets is not particularly limited. The droplets are formed, for example, by means of a device capable of strong stirring, such as an in-line type emulsifying and dispersing machine (product name: MILDER; manufactured by Pacific Machinery & Engineering Co., Ltd.) and a high-speed emulsification dispersing machine (product name: T. K. HOMOMIXER MARK II; manufactured by PRIMIX Corporation).

As the polymerization initiator, examples include: persulfates such as potassium persulfate and ammonium persulfate; azo compounds such as 4,4'-azobis(4-cyanovaleric acid), 2,2'-azobis(2-methyl-N-(2-hydroxyethyl)propionamide), 2,2'-azobis(2-amidinopropane)dihydrochloride, 2,2'-azobis(2,4-dimethylvaleronitrile) and 2,2'-azobisisobutyronitrile; and organic peroxides such as di-t-butylperoxide, benzoylperoxide, t-butylperoxy-2-ethylhexanoate, t-butylperoxy-2-ethylbutanoate, t-hexylperoxy-2-ethylbutanoate, diisopropylperoxydicarbonate, di-t-butylperoxyisophthalate and t-butylperoxyisobutyrate. They can be used solely or in combination of two or more kinds. Among them, the organic peroxides are preferably used since they can reduce a residual polymerizable monomer and can impart excellent printing durability.

Among the organic peroxides, preferred are peroxy esters, and more preferred are non-aromatic peroxy esters, i.e., peroxy esters having no aromatic ring, since they have good initiator efficiency and can reduce a residual polymerizable monomer.

The polymerization initiator may be added after dispersing the polymerizable monomer composition in the aqueous medium and before forming the droplets as described above, or it may be added to the polymerizable monomer composition before dispersing the polymerizable monomer composition in the aqueous medium.

The added amount of the polymerization initiator used in the polymerization reaction of the polymerizable monomer composition, is preferably from 0.1 parts by mass to 20 parts by mass, more preferably from 0.3 parts by mass to 15 parts by mass, and still more preferably from 1 part by mass to 10 parts by mass, with respect to 100 parts by mass of the monovinyl monomer.

In the present disclosure, the aqueous medium means a medium containing water as a main component.

In the present disclosure, the dispersion stabilizer is preferably added to the aqueous medium. As the dispersion stabilizer, examples include the following inorganic and organic compounds: inorganic compounds including sulfates such as barium sulfate and calcium sulfate, carbonates such as barium carbonate, calcium carbonate and magnesium carbonate, phosphates such as calcium phosphate, metal oxides such as aluminum oxide and titanium oxide, and metal hydroxides such as aluminum hydroxide, magnesium hydroxide and iron(II) hydroxide, and organic compounds including water-soluble polymers such as polyvinyl alcohol, methyl cellulose and gelatin; anionic surfactants, nonionic surfactants, and ampholytic surfactants. These dispersion stabilizers can be used solely or in combination of two or more kinds.

Among the above dispersion stabilizers, the inorganic compounds are preferable. As the aqueous medium containing the dispersion stabilizer, a colloid of a hardly water-soluble metal hydroxide is particularly preferable. The use of the inorganic compounds, particularly the use of the colloid of the hardly water-soluble metal hydroxide, can narrow the particle size distribution of the colored resin particles and can reduce the amount of the dispersion stabilizer remaining after washing. Accordingly, the polymerized toner thus obtained becomes capable of reproducing clear images and inhibiting a deterioration in environmental stability.

(A-3) Polymerization Step

After the polymerizable monomer composition droplets are formed as described in the above (A-2), the polymerizable monomer composition is subjected to polymerization reaction in the presence of a polymerization initiator, whereby colored resin particles are formed. That is, the aqueous dispersion medium in which the polymerizable monomer composition are dispersed, is heated to start polymerization, whereby, an aqueous dispersion of the colored resin particles containing the magenta colorant is formed.

The polymerization temperature of the polymerizable monomer composition is preferably 50° C. or more, and more preferably from 60° C. to 95° C. The polymerization reaction time is preferably from 1 to 20 hours, more preferably from 2 to 15 hours.

The colored resin particles may be used as the polymerized toner as they are or in the form of a mixture with an external additive. It is preferable to use the above-mentioned colored resin particles as the core layer of so-called core-shell type (or "capsule type") colored resin particles. The core-shell type colored resin particles have a structure such that the outside of the core layer is covered with a shell layer that is made of a different substance from the core layer. The core layer is made of a substance having a low softening point, and by covering the core layer with a substance having a higher softening point, the toner can take a balance of lowering the fixing temperature of the toner and prevention of toner aggregation during storage.

The method for producing the above-mentioned core-shell type colored resin particles by using the above-mentioned colored resin particles, is not particularly limited, and they can be produced by any conventional method. The in situ polymerization method and the phase separation method are preferable from the viewpoint of production efficiency.

Hereinafter, the method for producing the core-shell type colored resin particles according to the in situ polymerization method, will be described.

The core-shell type colored resin particles can be obtained by adding a polymerizable monomer for forming a shell layer (a polymerizable monomer for shell) and a polymerization initiator to the aqueous medium in which the colored resin particles are dispersed, and then polymerizing the monomer.

As the polymerizable monomer for shell, the above-mentioned polymerizable monomers can be similarly used. Among the polymerizable monomers, those that can provide a polymer having a Tg of more than 80° C., such as styrene, acrylonitrile and methyl methacrylate, are preferably used solely or in combination of two or more kinds.

As the polymerization initiator used for polymerization of the polymerizable monomer for shell, examples include, but are not limited to, water-soluble polymerization initiators including metal persulfates such as potassium persulfate and ammonium persulfate, and azo-type initiators such as 2,2'-azobis(2-methyl-N-(2-hydroxyethyl)propionamide) and 2,2'-azobis(2-methyl-N-(1,1-bis(hydroxymethyl)-2-hydroxyethyl)propionamide). These polymerization initiators can be used solely or in combination of two or more kinds. The content of the polymerization initiator is preferably from 0.1 parts by mass to 30 parts by mass, and more preferably from 1 part by mass to 20 parts by mass, with respect to 100 parts by mass of the polymerizable monomer for shell.

The polymerization temperature of the shell layer is preferably 50° C. or more, and more preferably from 60° C. to 95° C. The polymerization reaction time is preferably from 1 to 20 hours, and more preferably from 2 to 15 hours.

(A-4) Washing, Filtering, Dehydrating and Drying Steps

It is preferable that after the polymerization, the aqueous dispersion of the colored resin particles obtained by the polymerization is subjected to operations of filtering, washing for removal of the dispersion stabilizer, dehydrating, and drying by several times as needed, according to any conventional method.

The washing step may be carried out by the following method: when the inorganic compound is used as the dispersion stabilizer, it is preferable that the dispersion stabilizer is dissolved in water and removed by adding acid or alkali to the aqueous dispersion of the colored resin particles. When the colloid of the hardly water-soluble inorganic hydroxide is used as the dispersion stabilizer, it is preferable that the pH of the aqueous dispersion of the colored resin particles is adjusted to 6.5 or less by adding acid. As the added acid, examples include inorganic acid such as sulfuric acid, hydrochloric acid and nitric acid, and organic acid such as formic acid and acetic acid. Among them, sulfuric acid is particularly preferable for its high removal efficiency and small impact on production facilities.

The dehydrating and filtering steps may be carried out by any of various known methods, without particular limitation. For example, a centrifugal filtration method, a vacuum filtration method and a pressure filtration method may be used. Also, the drying step may be carried out by any of various methods, without particular limitation.

(B) Pulverization Method

In the case of producing the colored resin particles by employing the pulverization method, the production is carried out by the following steps, for example.

First, a binder resin, a magenta colorant and other additives which are added as needed, such as a charge control agent and a release agent, are mixed by means of a mixer such as a ball mill, a V type mixer, FM MIXER (: product name), a high-speed dissolver, an internal mixer and a fallberg. Next, the thus-obtained mixture is kneaded while heating by means of a press kneader, a twin screw kneading machine, a roller or the like. The thus-obtained kneaded product is coarsely pulverized by means of a pulverizer such as a hammer mill, a cutter mill and a roller mill. The coarsely pulverized product is pulverized by finely pulverizing by means of a pulverizer such as a jet mill and a high-speed rotary pulverizer. Then, the finely pulverized product is classified into desired particle diameters by means of a classifier such as an air classifier and an airflow classifier, thereby obtaining colored resin particles produced by the pulverization method.

As the binder resin, the magenta colorant and the other additives added as needed (such as the charge control agent and the release agent), those mentioned above in "(A) Suspension polymerization method" can be used in the pulverization method. Similarly to the colorant resin particles obtained by the above-mentioned (A) suspension polymerization method, the colored resin particles obtained by the pulverization method can also be used in a method such as a in situ polymerization method to produce core-shell type colored resin particles.

As the binder resin, other resins which are conventionally and broadly used for toners can be used. As the binder resin used in the pulverization method, examples also include, but are not limited to, polystyrene, styrene-butyl acrylate copolymers, polyester resins and epoxy resins.

2. Colored Resin Particles

The colored resin particles containing the magenta colorant are obtained by the production method such as the above-mentioned "(A) Suspension polymerization method" and "(B) Pulverization method".

Hereinafter, the colored resin particles constituting the toner will be described. The colored resin particles described below include both core-shell type colored resin particles and colored resin particles which are not core-shell type.

The volume average particle diameter (Dv) of the colored resin particles is preferably from 3 μm to 15 μm, and more preferably from 4 μm to 12 μm. When the Dv is less than 3 μm, a decrease in toner flowability, a deterioration in transferability, or a decrease in image density may occur. When the Dv is more than 15 μm, a decrease in image resolution may occur.

As for the colored resin particles, the ratio (Dv/Dn) between the volume average particle diameter (Dv) and the number average particle diameter (Dn) is preferably from 1.0 to 1.3, and more preferably from 1.0 to 1.2. When the "Dv/Dn" ratio is more than 1.3, a decrease in transferability, image density or resolution may occur. The volume average particle diameter and the number average particle diameter of the colored resin particles can be measured by means of a particle diameter distribution measuring device (product name: MULTISIZER; manufactured by Beckman Coulter, Inc.), for example.

The average circularity of the colored resin particles of the present disclosure is in a range of preferably from 0.96 to 1.00, more preferably from 0.97 to 1.00, and still more preferably from 0.98 to 1.00, from the viewpoint of the image reproducibility.

When the average circularity of the colored resin particles is less than 0.96, a deterioration in thin line reproducibility in printing may occur.

3. Toner of the Present Disclosure

As the toner of the present disclosure, the colored resin particles containing the magenta colorant can be used as they are. From the viewpoint of controlling the chargeability, flowability, shelf stability, etc., of the toner, the colored resin particles may be used as a one-component toner by mixing the colored resin particles with the external additive to add the external additive on the surface of the colored resin particles.

The one-component toner may be further mixed with carrier particles and made into a two-component toner.

A mixer is used to add the external additive on the particle surface. The mixer is not particularly limited, as long as it is a mixer capable of add the external additive on the surface of the colored resin particles. For example, the external additive can be added by means of a mixing machine capable of mixing and stirring, such as FM MIXER (: product name, manufactured by NIPPON COKE & ENGINEERING CO., LTD.), SUPER MIXER (: product name, manufactured by KAWATA Manufacturing Co., Ltd.), Q MIXER (: product name, manufactured by NIPPON COKE & ENGINEERING CO., LTD.), MECHANOFUSION SYSTEM (: product name, manufactured by Hosokawa Micron Corporation) and MECHANOMILL (: product name, manufactured by Okada Seiko Co., Ltd.)

As the external additive, examples include, but are not limited to, inorganic fine particles such as fine particles of silica, titanium oxide, aluminum oxide, zinc oxide, tin oxide, calcium carbonate, calcium phosphate and cerium oxide, and organic fine particles such as fine particles of polymethyl methacrylate resin, silicone resin and melamine resin. Among them, the inorganic fine particles are preferable. Among the inorganic fine particles, fine particles of at least one selected from silica and titanium oxide are preferable, and fine particles of silica are particularly preferable.

These external additives may be used solely. It is preferable to use them in combination of two or more kinds.

In the present disclosure, the external additive is used in an amount of generally from 0.05 parts by mass to 6 parts by mass, and preferably from 0.2 parts by mass to 5 parts by mass, with respect to 100 parts by mass of the colored resin particles. When the added amount of the external additive is less than 0.05 parts by mass, a transfer residue may be generated. When the added amount of the external additive is more than 6 parts by mass, fog may occur.

Since the toner of the present disclosure obtained through the above-described steps uses the specific amount of the above-mentioned magenta pigment, the toner is a magenta toner which shows, even in small amounts, sharper color and higher reflection density than ever before, and which is excellent in balance between low-temperature fixability and heat-resistant shelf stability.

EXAMPLES

Hereinafter, the present disclosure will be described further in detail, with reference to examples and comparative examples. However, the present disclosure is not limited to these examples. Herein, part(s) and % are on a mass basis unless otherwise noted.

Test methods carried out in the examples and the comparative examples are as follows.

1. Production of Magenta Pigment

Production Example 1: Production of Mixed Crystal of Magenta Pigment

First, 2,5-di-(4-methylphenylamino)terephthalic acid was cyclized in phosphoric acid to synthesize 2,9-dimethylquinacridone (C.I. Pigment Red 122). The thus-obtained phosphoric acid dispersion of the 2,9-dimethylquinacridone was mixed with water. The mixture was filtered through a filter and then washed with water. The washed 2,9-dimethylquinacridone was mixed again with water to obtain an aqueous dispersion having a solid content of 20%.

Similarly, an aqueous dispersion of quinacridone (C.I. Pigment Violet 19) having a solid content of 20% was prepared by using 2,5-di-phenylaminoterephthalic acid. Next, 250 parts of the aqueous dispersion having a solid content of 20% of dimethylquinacridone (C.I. Pigment Red 122), 250 parts of the aqueous dispersion having a solid content of 20% of quinacridone (C.I. Pigment Violet 19) and 250 parts of ethanol were mixed to obtain a mixed solution of the pigments. This mixed solution was transferred to a container equipped with a condenser, and while grinding the pigments, the solution was reacted for 5 hours under heating and refluxing. After completion of the reaction, the pigments were separated from the reaction solution by filtration, washed, dried and then pulverized to obtain a mixed crystal of the magenta pigments (that is, a mixed crystal of the C.I. Pigment Red 122 and the C.I. Pigment Violet 19). Here, the mass ratio of the pigments contained in the mixed crystal was as follows: C.I. Pigment Red 122: C.I. Pigment Violet 19=1:1.

Production Example 2: Production of Magenta Pigment A2

First, 20 parts of 4-chloro-6-amino m-sulfonic acid was dispersed in 300 parts of water. Then, 22 parts of 20% hydrochloric acid was added thereto. In addition, ice was added thereto. While keeping the temperature of the mixture at 0° C., 25.1 parts of a 30% aqueous sodium nitrite solution was added thereto in a dropwise manner, thereby obtaining a diazonium salt suspension.

Next, 10.2 parts (equivalent to about 5% of the magenta pigment A2) of a potassium salt solution of disproportionated rosin (acid value: 170 mg/KOH/g), in which the pure content of the disproportionated rosin is 25%, was added to 500 parts of water. While stirring the thus-obtained diluted solution of the potassium salt of the disproportionated rosin, an aqueous solution containing 1.82 parts of strontium chloride was added thereto, thereby obtaining a suspension containing a strontium salt of the disproportionated rosin (a suspension A).

Next, 20.6 parts of 2-hydroxy-3-naphthoic acid was dispersed in 380 parts of hot water at 60° C. Then, 20.1 parts of 48% aqueous sodium caustic solution was added thereto, thereby obtaining a coupler solution.

The coupler solution was added to the suspension A to obtain a coupler liquid (a coupler component).

After cooling the coupler liquid to 0° C., the diazonium salt suspension was added thereto in a dropwise manner over a period of 30 minutes, while stirring the coupler solution. The thus-obtained mixed solution was stirred at 0° C. to 3° C. for 60 minutes to terminate a coupling reaction, thereby obtaining a dye suspension.

An aqueous solution was obtained by dissolving 20.18 parts of strontium chloride in 90 parts of water. The aqueous solution was added to the dye suspension, and the mixture was stirred for 60 minutes to terminate lake-forming. After completion of the lake-forming reaction, the mixture was stirred with heating at 30° C. for 60 minutes to obtain an aqueous suspension of a strontium laked azo pigment (C.I. Pigment Red 48:3) surface-treated with the strontium salt of the disproportionated rosin. Then, the suspension was heated to 60° C. and then stirred for 60 minutes. After adjusting the pH of the suspension to 7.6 with hydrochloric acid, the suspension was filtered and washed. Then, a wet cake containing the pigment was isolated therefrom. The isolated wet cake was dried to obtain a powder of a red magenta pigment A2.

Production Example 3: Production of Magenta Pigment A3

A magenta pigment A3 was produced similarly as in Production Example 2, except that the disproportionated rosin (acid value: 170 mg/KOH/g) was changed to a disproportionated rosin (acid value: 100 mg/KOH/g).

Measurement of Acid Value of Pigments

The acid values of a magenta pigment A1 (manufactured by Daidokasei Co., Ltd., product name: NO. 5500 ST-RED, pigment classification: C.I. Pigment Red 48:3), the magenta pigment A2 obtained in Production Example 2, the magenta pigment A3 obtained in Production Example 3, a magenta pigment X (manufactured by Daidokasei Co., Ltd., product name: NO. 7510, pigment classification: C.I. Pigment Red 57:1) and a magenta pigment Y (pigment classification: C.I. Pigment Red 48:3, the content of the metal rosinate with respect to 100 parts by mass of the magenta pigment Y: 10.0 parts) were measured in conformity to JIS K 0070.

2. Production of Colored Resin Particles

Colored Resin Particles (1)

2-1. Preparation of Polymerizable Monomer Composition for Core

First, 73 parts of styrene, 27 parts of n-butyl acrylate, 0.15 parts of divinylbenzene, 0.4 parts of tetraethylthiuram disulfide, 4.0 parts of the magenta pigment A1 (manufactured by Daidokasei Co., Ltd., product name: NO. 5500 ST-RED, pigment classification: C.I. Pigment Red 48:3, the content of the metal rosinate (Sr salt) with respect to 100 parts of the magenta pigment A1: 5.0 parts) as a magenta colorant, and 3.0 parts of C.I. Pigment Red 122 (CAS No. 980-26-7, manufactured by Clariant, product name: TONER MAGENTA E) were wet-pulverized by means of a media-type disperser (product name: PICOMILL, manufactured by ASADA IRON WORKS. Co., Ltd.) To the mixture obtained by the wet pulverization, 1.0 part of a charge control resin (a quaternary ammonium salt group-containing styrene-acrylic copolymer, the copolymerization ratio of monomers having a functional group: 8%) and 9.0 parts of an ester wax (manufactured by NOF Corporation, polyhydric alcohol ester) were added, mixed and dissolved to prepare a polymerizable monomer composition.

2-2. Preparation of Aqueous Dispersion Medium

An aqueous solution in which 9.9 parts of sodium hydroxide was dissolved in 50 parts of ion exchanged water, was gradually added under stirring to an aqueous solution in which 14.1 parts of magnesium chloride was dissolved in 280 parts of ion exchanged water, whereby a magnesium hydroxide colloidal dispersion was prepared.

2-3. Preparation of Polymerizable Monomer for Shell

Meanwhile, 2 parts of methyl methacrylate and 130 parts of water were finely dispersed by means of an ultrasonic emulsifier to prepare an aqueous dispersion of a polymerizable monomer for shell.

2-4. Droplets Forming Step

The polymerizable monomer composition was added to the magnesium hydroxide colloidal dispersion (the magnesium hydroxide colloid amount: 7.2 parts), and the mixture was further stirred. Then, as a polymerization initiator, 4.4 parts of t-butylperoxy-2-ethyl hexanoate was added thereto. The dispersion mixed with the polymerization initiator was dispersed at a rotational frequency of 15,000 rpm by an in-line type emulsifying and dispersing machine (manufactured by Pacific Machinery & Engineering Co., Ltd, product name: MILDER) to form the polymerizable monomer composition into droplets.

2-5. Suspension Polymerization Step

The dispersion containing the polymerizable monomer composition droplets, was placed in a reactor, and the temperature of the container was raised to 90° C. to initiate a polymerization reaction. After a polymerization conversion rate of almost 100% was reached, a solution prepared by dissolving, as a polymerization initiator for shell, 0.1 parts of 2,2'-azobis[2-methyl-N-(2-hydroxyethyl)-propionamide] (product name: VA-086, manufactured by Wako Pure Chemical Industries, Ltd., a water-soluble initiator) in the aqueous dispersion of the polymerizable monomer for shell, was added to the reactor. Subsequently, the polymerization reaction was further continued by maintaining the container temperature at 95° C. for 4 hours, and then the polymerization reaction was stopped by water cooling to obtain an aqueous dispersion of core-shell type colored resin particles.

2-6. Post-Treatment Step

The aqueous dispersion of the colored resin particles was subjected to acid washing (25° C., 10 minutes) by adding, while stirring the aqueous dispersion, sulfuric acid to the dispersion until the pH of the dispersion reaches 6.0 or less. Then, the colored resin particles were separated by filtration and washed with water. The washing water was filtered. The electric conductivity of the filtrate at this time was 20 μS/cm. Furthermore, the colored resin particles subjected to the washing and filtering steps were dehydrated and dried to obtain dried colored resin particles (1).

Colored Resin Particles (2)

Colored resin particles (2) were obtained in the same manner as the method for producing the colored resin particles (1), except the following: in the "Preparation of Polymerizable Monomer Composition for Core", the added amount of the magenta pigment A1 was changed from 4.0 parts to 3.0 parts.

Colored Resin Particles (3)

Colored resin particles (3) were obtained in the same manner as the method for producing the colored resin particles (1), except the following: in the "Preparation of Polymerizable Monomer Composition for Core", the added amount of the magenta pigment A1 was changed from 4.0 parts to 3.0 parts, and 3.0 parts of the C.I. Pigment Red 122 was changed to 3.0 parts of the mixed crystal of the magenta pigments of Production Example 1.

Colored Resin Particles (4)

Colored resin particles (4) were obtained in the same manner as the method for producing the colored resin particles (1), except the following: in the "Preparation of Polymerizable Monomer Composition for Core", the added amount of the magenta pigment A1 was changed from 4.0 parts to 3.0 parts, and 3.0 parts of the C.I. Pigment Red 122 was changed to 3.0 parts of C.I. Solvent Violet 19 (CAS No. 1047-16-1, manufactured by Clariant, product name: INK JET MAGENTA E5B02).

Colored Resin Particles (5)

Colored resin particles (5) were obtained in the same manner as the method for producing the colored resin particles (1), except the following: in the "Preparation of Polymerizable Monomer Composition for Core", 4.0 parts of the magenta pigment A1 was changed to 3.0 parts of C.I. Pigment Red 48:3 (not surface-treated).

Colored Resin Particles (6)

Colored resin particles (6) were obtained in the same manner as the method for producing the colored resin particles (1), except the following: in the "Preparation of Polymerizable Monomer Composition for Core", 4.0 parts of the magenta pigment A1 was changed to 3.0 parts of the magenta pigment X (manufactured by Daidokasei Co., Ltd., product name: NO. 7510, pigment classification: C.I. Pigment Red 57:1, the content of the metal rosinate (Sr salt) with respect to 100 parts of the magenta pigment X: 5.0 parts).

Colored Resin Particles (7)

Colored resin particles (7) were obtained in the same manner as the method for producing the colored resin particles (1), except the following: in the "Preparation of Polymerizable Monomer Composition for Core", 4.0 parts of the magenta pigment A1 was changed to 3.0 parts of the magenta pigment Y (pigment classification: C.I. Pigment Red 48:3, the content of the metal rosinate with respect to 100 parts of the magenta pigment Y: 10.0 parts).

Colored Resin Particles (8)

Colored resin particles (8) were obtained in the same manner as the method for producing the colored resin particles (1), except the following: in the "Preparation of Polymerizable Monomer Composition for Core", the added amount of the magenta pigment A1 was changed from 4.0 parts to 6.0 parts, and the C.I. Pigment Red 122 was not used.

Colored Resin Particles (9)

Colored resin particles (9) were obtained in the same manner as the method for producing the colored resin particles (1), except the following: in the "Preparation of polymerizable monomer composition for core", both the magenta pigment A1 and the C.I. Pigment Red 122 were not used, and 7.0 parts of the mixed crystal of the magenta pigments of Production Example 1 was used.

Colored Resin Particles (10)

Colored resin particles (10) were obtained in the same manner as the method for producing the colored resin particles (1), except the following: in the "Preparation of polymerizable monomer composition for core", both the magenta pigment A1 and the C.I. Pigment Red 122 were not used, and 3.0 parts of C.I. Solvent Violet 59 (CAS No. 6408-72-6, manufactured by Clariant, product name: SOLVAPERM RED VIOLET R) and 3.0 parts of C.I. Pigment Red 146 (CAS No. 5280-68-2, manufactured by Clariant, product name: PERMANENT CARMINE FBB02) were used.

Colored Resin Particles (11)

Colored resin particles (11) were obtained in the same manner as the method for producing the colored resin particles (10), except that the added amount of the C.I. Pigment Red 146 was changed from 3.0 parts to 4.0 parts.

Colored Resin Particles (12)

Colored resin particles (12) were obtained in the same manner as the method for producing the colored resin particles (2), except that the magenta pigment A1 was changed to the magenta pigment A2 obtained in Production Example 2.

Colored Resin Particles (13)

Colored resin particles (13) were obtained in the same manner as the method for producing the colored resin particles (2), except that the magenta pigment A1 was changed to the magenta pigment A3 obtained in Production Example 3.

Colored Resin Particles (14)

Colored resin particles (14) were obtained in the same manner as the method for producing the colored resin particles (13), except the following: the added amount of the magenta pigment A3 was changed from 3.0 parts to 4.8 parts, and the C.I. Pigment Red 122 was not used.

3. Production of Magenta Toner

The magenta toners of Examples 1 to 7 and Comparative Examples 1 to 7 were produced by adding external additives on the surface of the colored resin particles (1) to (14).

Example 1

To 100 parts of the colored resin particles (1), 0.2 parts of hydrophobized silica fine particles having an average particle diameter of 7 nm, 1.0 part of hydrophobized silica fine particles having an average particle diameter of 22 nm, and 1.26 parts of hydrophobized silica fine particles having an average particle diameter of 50 nm, were added. They were mixed by means of a high-speed mixing machine (manufactured by NIPPON COKE & ENGINEERING CO., LTD., product name: FM MIXER) to prepare the magenta toner of Example 1.

Examples 2 to 7 and Comparative Examples 1 to 7

The magenta toners of Examples 2 to 7 and Comparative Examples 1 to 7 were obtained in the same manner as in Example 1, except that the colored resin particles (1) were changed to the colored resin particles (2) to (14) as shown below in Table 1.

4. Evaluation of Magenta Toners

For the magenta toners of Examples 1 to 7 and Comparative Examples 1 to 7, the coarse particle amount, image density, chroma, minimum fixing temperature, fog under a normal temperature and normal humidity (N/N) environment, heat-resistant temperature (evaluation of shelf stability), printing durability (durability test) and charge amount (blow-off charge amount) were measured as follows.

4-1. Evaluation of Coarse Particle Amount

The coarse particle amount was evaluated by a particle diameter distribution measuring device (manufactured by Beckman Coulter, Inc., product name: MULTISIZER). The measurement by this MULTISIZER was carried out under the following conditions:

Aperture diameter: 100 μm

Dispersion medium: ISOTONE II (: product name)

Concentration: 10%

Number of measured particles: 100,000

The detailed measurement procedure is as follows. First, 0.2 g of a toner sample was taken into a beaker. As a dispersant, a surfactant aqueous solution (product name: DRY WELL, manufactured by Fujifilm Co., Ltd.) was added therein. Then, 2 mL of the dispersion medium was further added to wet the toner. Then, 10 mL of the dispersion medium was further added. Then, the toner sample was dispersed by an ultrasonic disperser for one minute, and then the particle diameter distribution on a volume basis was measured by the above-described particle diameter distribution measuring device.

From the particle diameter distribution obtained by the measurement, the ratio (volume %) of particles having a particle size of 20 μm or more was obtained and defined as the coarse particle amount.

4-2. Measurement of Image Density and Chroma

A commercially-available, non-magnetic one-component developing color printer (printing rate: 20 sheets/min) was used. The toner cartridge of the development device was filled with a sample magenta toner, and printing sheets were loaded in the printer. Then, the printer was left for a whole day and night in an (N/N) environment at a temperature of 23° C. and a humidity of 50% RH. Then, while the amount of the toner supplied onto the developing roller in solid pattern printing (M/A) was fixed at the value shown in the following Table 1 (0.25 $mg/cm^2$ to 0.32 $mg/cm^2$), sheets were continuously printed at an image density of 5%. Solid pattern printing (image density: 100%) was carried out on the tenth sheet. Using a McBeth transmitting image densitometer, the image density (ID) and chroma (C*) of the tenth sheet were measured. The image density (ID) is preferably 1.00 or more. The chroma (C*) is preferably 66.0 or more.

4-3. Minimum Fixing Temperature of Toner

A commercially-available, non-magnetic one-component developing printer (a 24 sheets per minute printer; printing speed: 24 sheets/min) was modified so that the temperature of the fixing roll part was able to be changed. The temperature of the fixing roll of the printer was changed, and the fixing rate at each changed temperature was measured. The relationship between the temperature and the fixing rate was determined, and the lowest temperature at which a fixing rate of 80% or more was obtained, was defined as the minimum fixing temperature.

The fixing rate was calculated from the image density ratio before and after a rubbing test operation of a black solid area on a test paper sheet printed by the printer. That is, when the image density before the rubbing test is determined as "ID (before)" and the image density after the rubbing test is determined as "ID (after)", the fixing rate is determined as follows: the fixing rate (%)=[ID (after)/ID (before)]×100. Here, the black solid area is an area controlled so that a developer adheres to all of dots (virtual dots for controlling a printer control unit) within the area. The rubbing test operation is a series of the following operations: a measurement part for the test paper sheet is attached to a fastness tester with an adhesive tape; a 500 g load is applied; and reciprocating rubbing is carried out 5 times with a rubbing terminal wrapped with a cotton cloth.

4-4. Measurement of Fog in Normal Temperature and Normal Humidity (N/N) Environment The commercially-available, non-magnetic one-component developing printer and the toner to be evaluated were left for a whole day and night in a normal temperature and normal humidity (N/N) environment at a temperature of 23° C. and a humidity of 50% RH.

The fog measurement was carried out in the following manner. First, the color tone of an unprinted sheet was measured and used as a reference value (E0). Next, using the toner, white solid printing was carried out on the sheet with the same printer as "4-2. Measurement of Image density and Chroma". The hues (E1 to E6) of any 6 points on the thus-printed white solid pattern were measured. The color difference (ΔE) between each of the hues (E1 to E6) and the reference (E0) was calculated. Of the thus-obtained color differences, the largest color difference ΔE was used as the fog value of the toner, and it was evaluated as follows. In the evaluation, a smaller fog value means less fog and better printing. The hues were measured by means of a spectrophotometer (manufactured by X-Rite Inc., product name: SPECTROEYE).

A: The ΔE is less than 0.5.

B: The ΔE is 0.5 or more and less than 1.5.

F: The ΔE is 1.5 or more.

4-5. Evaluation of Shelf Stability

First, 10 g of the toner was placed in a 100 mL polyethylene container, and the container was sealed. Then, the container was set in a constant temperature water bath which was set to a predetermined temperature. After 8 hours passed, the container was removed from the constant temperature water bath. The toner was transferred from the removed container onto a 42-mesh sieve in a manner preventing vibration as much as possible, and then it was set in a powder characteristic tester (manufactured by Hosokawa Micron Corporation, product name: POWDER TESTER PT-R). The amplitude condition of the sieve was set to 1.0 mm, and the sieve was vibrated for 30 seconds. Then, the mass of the toner remaining on the sieve was measured, and the thus-measured mass was determined as an aggregated toner mass.

The maximum temperature at which the aggregated toner mass becomes 0.5 g or less, was determined as the heat-resistant temperature of the toner.

4-6. Durability Test

The toner was put in a commercially-available printer, and the printer was left for a whole day and night in a N/N environment. Then, continuous printing was carried out at a printing density of 1%, and the printing density and fog were measured for every 1000 sheets. The printing density was obtained by measuring the solid-printed sheets by using a Macbeth reflection densitometer.

Fog was measured as follows. A white solid pattern was printed, and the printer was stopped in the middle of the printing. A piece of an adhesive tape was attached to the toner in a non-image area on the photoconductor after development. Then, the tape was removed therefrom and attached to a new printing sheet, and the hue was measured in the same manner as the above-mentioned "4-4. Measurement of Fog in Normal Temperature and Normal Humidity (N/N) Environment". As the reference sample, an unused piece of the adhesive tape was attached to the printing sheet, and the hue was measured in the same manner. A color difference ΔE was calculated from the hues of the measurement sample and the reference sample and determined as a fog value.

A durability test was carried out on up to 15000 sheets, which is the number of continuously printed sheets that could maintain such an image quality, that the fog value was 3 or less at the time of carrying out the white solid pattern printing. Of the test results shown in Table 1, ">15000" indicates that the above-mentioned criteria was still met even after 15,000 sheets were continuously printed.

4-7. Blow-Off Charge Amount

Under a normal temperature and normal humidity (N/N) environment at a temperature of 23° C. and a humidity of 50% RH, 9.5 g of a carrier (manufactured by Powdertech Co., Ltd., product name: EF80B2, Mn—Mg—Sr soft ferrite, average particle size: 80 μm, particle size distribution: 50 μm to 100 μm) and 0.5 g of the toner were weighed out and placed in a glass container with a volume of 30 mL. The glass container was rotated at 150 rpm for 30 minutes to frictionally charge the toner particles. The obtained carrier and toner particles were blown off with nitrogen gas at a pressure of 1 kg/$cm^2$ by a blow-off meter (manufactured by Toshiba Chemical Corporation, product name: TB-200), and the blow-off charge amount of the toner was measured.

Table 1 shows the measurement and evaluation results of the magenta toners of Examples 1 to 7 and Comparative Examples 1 to 7, along with each toner composition.

In the following Table 1, "PR48:3" represents C.I. Pigment Red 48:3; "PR57:1" represents C.I. Pigment Red 57:1; "PR122" represents C.I. Pigment Red 122; "PV19" represents C.I. Pigment Violet 19; "SV59" represents C.I. Solvent Violet 59; and "PR146" represents C.I. Pigment Red 146. Also in the following Table 1, "Surface treatment amount (parts)" means the content (parts) of the metal rosinate with respect to 100 parts of the surface-treated magenta pigment A.

TABLE 1

| | | | Example 1 | Example 2 | Example 3 | Example 4 | Example 5 | Example 6 | Example 7 |
|---|---|---|---|---|---|---|---|---|---|
| Colored resin particles | | | Particles (1) | Particles (2) | Particles (3) | Particles (4) | Particles (12) | Particles (13) | Particles (14) |
| Colorant composition | Surface-treated magenta pigment | | Pigment A1 | Pigment A1 | Pigment A1 | Pigment A1 | Pigment A2 | Pigment A3 | Pigment A3 |
| | | Pigment classification | PR48:3 | PR48:3 | PR48:3 | PR48:3 | PR48:3 | PR48:3 | PR48:3 |
| | | Surface treatment amount (parts) | 5.0 | 5.0 | 5.0 | 5.0 | 5.0 | 5.0 | 5.0 |
| | | Pigment acid value (mgKOH/g) | 1.71 | 1.71 | 1.71 | 1.71 | 0.69 | 0.66 | 0.66 |
| | | Added amount (parts) | 4.0 | 3.0 | 3.0 | 3.0 | 3.0 | 3.0 | 4.8 |
| | PR48:3 (parts) | | — | — | — | — | — | — | — |
| | Mixed crystal of PR122 + PV19 (parts) | | — | — | 3.0 | — | — | — | — |
| | PR122 (parts) | | 3.0 | 3.0 | — | — | 3.0 | 3.0 | — |
| | PV19 (parts) | | — | — | 3.0 | — | — | — | — |
| | SV59 (parts) | | — | — | — | — | — | — | — |
| | PR146 (parts) | | — | — | — | — | — | — | — |
| | Added amount of colorants (parts) | | 7.0 | 6.0 | 6.0 | 6.0 | 6.0 | 6.0 | 4.8 |
| Evaluation results | Coarse particle amount (20 μm or more) (%) | | 0.9 | 0.6 | 0.4 | 0.5 | 0.2 | 0.1 | 0.8 |
| | M/A (mg/$cm^2$) | | 0.25 | 0.32 | 0.31 | 0.30 | 0.30 | 0.32 | 0.30 |
| | ID | | 1.18 | 1.04 | 1.06 | 1.03 | 1.03 | 1.03 | 1.01 |
| | Chroma | | 68.4 | 66.3 | 68.1 | 66.1 | 65.8 | 66.7 | 64.8 |
| | Minimum fixing temperature (° C.) | | 145 | 140 | 140 | 140 | 140 | 140 | 140 |
| | NN fog | | A | A | A | A | A | A | A |
| | Shelf stability (° C.) | | 55 | 55 | 55 | 55 | 56 | 55 | 55 |
| | Printing durability (sheets) | | >15000 | >15000 | >15000 | >15000 | >15000 | >15000 | 13000 |
| | Blow-off charge amount (μC/g) | | 80.3 | 70.1 | 73.1 | 72.6 | 75.1 | 73.6 | 71.4 |
| | | | Comparative Example 1 | Comparative Example 2 | Comparative Example 3 | Comparative Example 4 | Comparative Example 5 | Comparative Example 6 | Comparative Example 7 |
| Colored resin particles | | | Particles (5) | Particles (6) | Particles (7) | Particles (8) | Particles (9) | Particles (10) | Particles (11) |
| Colorant composition | Surface-treated magenta pigment | | — | Pigment X | Pigment Y | Pigment A1 | — | — | — |
| | | Pigment classification | — | PR57:1 | PR48:3 | PR48:3 | — | — | — |
| | | Surface treatment amount (parts) | — | 5.0 | 10.0 | 5.0 | — | — | — |
| | | Pigment acid value (mg/KOH) | — | 1.72 | 2.47 | 1.71 | — | — | — |
| | | Added amount (parts) | — | 3.0 | 3.0 | 6.0 | — | — | — |
| | PR48:3 (parts) | | 3.0 | — | — | — | — | — | — |
| | Mixed crystal of PR122 + PV19 (parts) | | — | — | — | — | 7.0 | — | — |

TABLE 1-continued

| | | | | | | | | |
|---|---|---|---|---|---|---|---|---|
| | PR122 (parts) | 3.0 | 3.0 | 3.0 | — | — | — | — |
| | PV19 (parts) | — | — | — | — | — | — | — |
| | SV59 (parts) | — | — | — | — | — | 3.0 | 3.0 |
| | PR146 (parts) | — | — | — | — | — | 3.0 | 4.0 |
| | Added amount of colorants (parts) | 6.0 | 6.0 | 6.0 | 6.0 | 7.0 | 6.0 | 7.0 |
| Evaluation results | Coarse particle amount (20 μm or more) (%) | | | 10.6 | 12.3 | — | — | — |
| | M/A (mg/cm$^2$) | | | | | 0.30 | 0.30 | 0.30 |
| | ID | | | | | 0.99 | 0.96 | 0.99 |
| | Chroma | | | | | 66.4 | 60.3 | 58.5 |
| | Minimum fixing temperature (° C.) | —* | —* | —† | —† | 150 | 140 | 140 |
| | NN fog | | | | | B | A | A |
| | Shelf stability (° C.) | | | | | 57 | 54 | 53 |
| | Printing durability (sheets) | | | | | 8000 | >15000 | >15000 |
| | Blow-off charge amount (μC/g) | | | | | 64.4 | 74.2 | 73.4 |

In Table 1 shown above, the asterisk (*) of the evaluation results of Comparative Examples 1 and 2 means that the colored resin particles were not obtained because the suspension polymerization reaction did not proceed, and the toner evaluation was not carried out. Also in Table 1 shown above, the dagger (t) of the evaluation results of Comparative Examples 3 and 4 means that the toner evaluation other than the evaluation of the coarse particle amount, was not carried out because the amount of the coarse particles was too large.

5. Conclusion of Toner Evaluation

The magenta toner of Comparative Example 1 is a toner in which the non-surface-treated C.I. Pigment Red 48:3 and C.I. Pigment Red 122 are contained in combination. In Comparative Example 1, since the suspension polymerization reaction did not proceed, colored resin particles could not be obtained. Therefore, it is clear that the production of colored resin particles is difficult in the case of using the non-surface-treated C.I. Pigment Red 48:3.

The magenta toner of Comparative Example 2 is a toner in which the magenta pigment X (the surface-treated C.I. Pigment Red 57:1) and C.I. Pigment Red 122 are contained in combination. In Comparative Example 2, since the suspension polymerization reaction did not proceed, colored resin particles could not be obtained. Therefore, it is clear that the production of colored resin particles is difficult in the case of using the surface-treated C.I. Pigment Red 57:1.

The magenta toner of Comparative Example 3 is a toner in which the magenta pigment Y (the surface-treated C.I. Pigment Red 48:3 for which the surface treatment amount is 10.0 parts) and C.I. Pigment Red 122 are contained in combination. In Comparative Example 3, the content of the coarse particles was 10.5% and too large. Therefore, it is clear that even in the case of using the surface-treated C.I. Pigment Red 48:3, the coarse particles are produced when the surface treatment amount is 10.0 parts or more.

The magenta toner of Comparative Example 4 is a toner in which the magenta pigment A1 is contained in an amount of 6.0 parts with respect to 100 parts of the binder resin. In Comparative Example 4, the content of the coarse particles was 12.3% and too large. Therefore, it is clear that even in the case of using the magenta pigment A, the coarse particles are produced when the added amount of the magenta pigment A is 6.0 parts or more.

The magenta toner of Comparative Example 5 is a toner in which only the mixed crystal of the C.I. Pigment Red 122 and the C.I. Pigment Violet 19 is contained as the magenta colorant. In Comparative Example 5, the minimum fixing temperature was 150° C. and high; the fog evaluation under the N/N environment was B; the durability test result was 8,000 sheets and small; and the blow-off charge amount was 64.4 μC/g and low. The minimum fixing temperature of the toner of Comparative Example 5 was the highest among the evaluated toners. The fog evaluation under the N/N environment of the toner of Comparative Example 5 was the lowest among the evaluated toners. The result of the durability test of the toner of Comparative Example 5 was the smallest among the evaluated toners. Also, the blow-off charge amount of the toner of Comparative Example 5 was the lowest among the evaluated toners. Therefore, it is clear that in the case of using only the mixed crystal, fog easily occurs because the charge amount of the toner is insufficient, and the printing durability and the low-temperature fixability are inferior.

The magenta toners of Comparative Examples 6 and 7 are toners in which C.I. Solvent Violet 59 and C.I. Pigment Red 146 are contained in combination as the magenta colorants. In Comparative Examples 6 and 7, the chroma (C*) was 60.3 or less and low, and the heat-resistant temperature was 54° C. or less and low. Therefore, it is clear that in the case of using C.I. Solvent Violet 59 and C.I. Pigment Red 146 in combination, the saturation (C*) is low, and the shelf stability is inferior.

Further, Comparative Example 6 was compared to Comparative Example 7. For the toner of Comparative Example 7 in which the content of C.I. Pigment Red 146 is 1.0 part larger than that of Comparative Example 6, the chroma (C*) is 58.5 and lower, and the heat resistance temperature is 53° C. and lower. Therefore, it is clear that in the case of using C.I. Solvent Violet 59 and C.I. Pigment Red 146 in combination, as the amount of the C.I. Pigment Red 146 increases, the chroma (C*) decreases, and the shelf stability deteriorates.

Meanwhile, the magenta toners of Examples 1 to 7 contain the magenta pigment A as the magenta colorant, which is the magenta pigment A1, A2 or A3 (the surface-treated C.I. Pigment Red 48:3 for which the surface treatment amount is 5.0 parts). The content of the magenta pigment A is from 3.0 parts to 4.8 parts, with respect to 100 parts of the binder resin.

For the toners of Examples 1 to 7, the coarse particle amount was 0.9% or less; the coarse particle amount was small even in the case of using C.I. Pigment Red 48:3; and the toner particles were controlled to have a desired particle diameter. For the toners of Examples 1 to 7, even when the supplied toner amount (M/A amount) was from 0.25 $mg/cm^2$ to 0.32 $mg/cm^2$ and small, both the image density and the chroma was such high, that the image density was 1.01 or more, and the chroma (C*) was 64.8 or more. Also for the toners of Examples 1 to 7, the minimum fixing temperature was 145° C. or less; the heat-resistant temperature was 55° C. or more; and they were excellent in both the low-temperature fixing property and the shelf stability. Further, since the toners of Examples 1 to 7 had a large blow-off charge amount of 70.1 pC/g or more and exhibit sufficient chargeability, the fog evaluation under the N/N environment was also high. In addition, since the durability test result was 13,000 sheets or more, that the toners of Examples 1 to 7 had excellent printing durability.

Especially, the magenta toners of Examples 5 and 6 had a remarkably reduced coarse particle amount of 0.2% or less, due to the use of the magenta pigment A having a low acid value of from 0.66 to 0.69 mg/KOH/g, and despite the use of C.I. Pigment Red 48:3, the magenta toners are toners containing a significantly small amount of coarse particles.

Therefore, the magenta toners of Examples 1 to 7, wherein the magenta pigment A obtained by surface-treating the pigment represented by the formula (1) with the metal rosinate, is contained as the magenta colorant; wherein the content of the magenta pigment A is from 1 part by mass to 5 parts by mass with respect to 100 parts by mass of the binder resin; and wherein the metal rosinate is contained at from 1 part by mass to 7 parts by mass with respect to 100 parts by mass of the magenta pigment A, are magenta toners which contain less coarse particles, which show sharper color and higher reflection density than ever before even in small amounts, which are excellent in balance between low-temperature fixability and heat-resistant shelf stability, and which have excellent printing durability.

The invention claimed is:

1. A magenta toner comprising a binder resin and a colorant, wherein the colorant included in the magenta toner consists of:

a magenta pigment A, which is obtained by surface-treating a pigment represented by the following formula (1) with a metal rosinate, and another magenta pigment different from the magenta pigment A;

wherein said another magenta pigment is at least one selected from C.I. Pigment Violet 19 and C.I. Pigment Red 122;

wherein a content of the magenta pigment A is from 1 part by mass to 5 parts by mass with respect to 100 parts by mass of the binder resin;

wherein the metal rosinate is contained at from 1 part by mass to 7 parts by mass with respect to 100 parts by mass of the magenta pigment A:

(1)

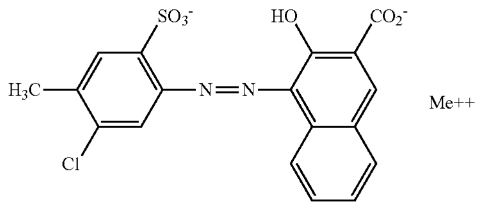

where Me represents a bivalent metal, wherein a mass ratio of the magenta pigment A and said another magenta pigment is from 60:40 to 40:60; and wherein the magenta toner further comprises a positively-chargeable charge control resin and is a positively-chargeable toner.

2. The magenta toner according to claim 1, wherein an acid value of the magenta pigment A is 2.4 mgKOH/g or less.

3. The magenta toner according to claim 1, wherein C.I. Pigment Violet 19 is contained as said another magenta pigment.

4. The magenta toner according to claim 1, wherein C.I. Pigment Red 122 is contained as said another magenta pigment.

5. A method for producing the magenta toner defined by claim 1, the method comprising:

a step comprising preparing a polymerizable monomer composition containing a polymerizable monomer and the magenta colorant which is composed of the magenta pigment A and said another magenta pigment at the mass ratio of from 60:40 to 40:60, a step comprising dispersing the polymerizable monomer composition in an aqueous medium containing a dispersion stabilizer, and a step comprising forming colored resin particles by subjecting the polymerizable monomer composition to polymerization reaction in the presence of a polymerization initiator.

6. The magenta toner according to claim 1, wherein the pigment represented by the following formula (1) is one selected from the group consisting of C.I. Pigment Red 48:1, C.I. Pigment Red 48:2, C.I. Pigment Red 48:3, C.I. Pigment Red 48:4, and C.I. Pigment Red 48:5.

7. The magenta toner according to claim 1, wherein the pigment represented by the following formula (1) is C.I. Pigment Red 48:3.

* * * * *